United States Patent [19]
An et al.

[11] Patent Number: 5,823,763
[45] Date of Patent: Oct. 20, 1998

[54] COMBUSTION DEVICE AND METHOD FOR USE IN A THERMAL OXIDATION FURNACE

[75] Inventors: Jung-geen An; Jung-soo An, both of Yongin, Rep. of Korea

[73] Assignee: Samsung Electronics Co., Ltd., Suwon, Rep. of Korea

[21] Appl. No.: 692,998

[22] Filed: Aug. 6, 1996

[30]   Foreign Application Priority Data

Feb. 22, 1996 [KR]  Rep. of Korea .................... 1996/4198

[51] Int. Cl.⁶ ......................................................... F23N 1/00
[52] U.S. Cl. .............................................. 431/41; 431/208
[58] Field of Search ............................. 431/41, 209, 208, 431/211, 212, 207

[56]   References Cited

U.S. PATENT DOCUMENTS 3,977,823   8/1976   Bernhard ..................................... 431/41

FOREIGN PATENT DOCUMENTS 101028   2/1960   Norway ................................. 431/208

Primary Examiner—James C. Yeung
Attorney, Agent, or Firm—Jones & Volentine, L.L.P.

[57]   ABSTRACT

A combustion device for use in an oxidation furnace, includes a nozzle providing $H_2$, a nozzle providing $O_2$, and an electrical heating coil placed in the $H_2$ nozzle for heating the $H_2$ to a temperature at which it reacts with the $O_2$.

5 Claims, 2 Drawing Sheets

COMBUSTION DEVICE AND METHOD FOR USE IN A THERMAL OXIDATION FURNACE

BACKGROUND OF THE INVENTION

The present invention relates to a combustion device and method used for using the combustion device in a furnace. More particularly, the present invention relates to an electrical combustion device used in a thermal oxidation furnace routinely used in the manufacture of semiconductors.

Conventional manufacturing processes for a semiconductor device typically include one or more steps wherein an oxide film is formed on a silicon wafer in an oxidation furnace. That is, within the multiplicity of steps required to form a semiconductor device, one step exposes a silicon wafer to a high temperature, oxidizing atmosphere to form a uniform oxidized film ($SiO_2$) on the surface of a silicon wafer. The resulting oxide film is very useful as a thin-film material in the semiconductor device, since the oxide film is very stable from a materials property viewpoint.

Several methods are known whereby a stable oxide film may be formed on silicon. These methods include thermal oxidation, anode oxidation, and plasma oxidation. Among these, thermal oxidation is the most useful. The thermal oxidation method may be further subdivided into a dry $O_2$ oxidation technique using dry $O_2$, a humid $O_2$ oxidation technique using $O_2$—$H_2O$, a steam oxidation technique using $H_2O$, and a hydrogen combustion oxidation technique using $H_2O$ generated through the combustion of $H_2$—$O_2$. Selection between these various oxidation techniques is made in accordance with the desired characteristics of the resulting semiconductor device. The present invention relates to the hydrogen combustion device finding application in a thermal oxidation furnace performing the hydrogen combustion type oxidation.

FIG. 1 is a schematic of a typical oxidation furnace. In FIG. 1, wafers 11 are mounted on a boat 13 and placed into a furnace 15. A combustion device 17 burning $H_2$ and $O_2$ gases is provided at the entrance of the furnace 15. Within this structure, $H_2$ and $O_2$ gases are introduced into the mouth of furnace 15, and combustion device 17 generates heat to burn the $H_2$ and $O_2$ gases, thereby generating $H_2O$. The $H_2O$ is thereafter injected into furnace 15 and oxidizes the surface of silicon wafers 11.

FIG. 2 shows the conventional combustion device in more detail. Referring to FIG. 2, the combustion device comprises a halogen lamp 21 as a heat emitting source, a reflective mirror 23, a heat attracting plate 25, an $H_2$ gas nozzle 27, and an $O_2$ gas nozzle 29. The reflective mirror 23 is arranged such that the light emitting from halogen lamp 21 is focused onto heat attracting plate 25. $H_2$ and $O_2$ gases initially flow through nozzles 27 and 29, respectively. When halogen lamp 21 is turned on, the light from halogen lamp 21 is focused onto heat attracting plate 25 by reflective mirror 23, thereby heating heat attracting plate 25. When the temperature of the $H_2$ gas increases due to the generated heat and reaches a critical temperature, the $H_2$ gas burns and reacts with the $O_2$ gas to generate $H_2O$.

In this conventional combustion device the reflective mirror may become corroded or contaminated. When such occurs only a small amount of light is reflected by the reflective mirror and the temperature of the heat attracting plate does not rise sufficiently. Given the resulting, insufficient combustion of the $H_2$ and $O_2$, the silicon wafer is incompletely oxidized. The yield of the resulting semiconductor device is, thus, adversely affected.

SUMMARY OF THE INVENTION

The present invention provides an oxidation furnace combustion device which more reliably and completely burns $H_2$ and $O_2$ gases. The present invention also provides a combustion method suitable for the operation of the combustion device according to the present invention.

Accordingly, in one aspect, the present invention provides a combustion device for use in a furnace comprising a first gas nozzle providing a first gas, a second gas nozzle providing a second gas, and an electrical heating coil placed in the first gas nozzle for heating the first gas to a temperature at which the first and second gases react. In another aspect, the present invention also provides a gas temperature sensor placed in the first gas nozzle, detecting the temperature of the first gas, and providing a signal indicative of the detected temperature, and a temperature controller receiving the signal from the gas temperature sensor and regulating electrical current supplied to the electrical heating coil in response to the signal.

In yet another aspect, the present invention provides a method of using a combustion device in an oxidation furnace, comprising the steps of providing first and second gases through respective first and second nozzles, and heating the first gas using an electrical heating coil placed in the first nozzle. The method may further include the steps of detecting the temperature of the first gas, and adjusting the flow of electrical current to the electrical heating coil in response to the detected temperature.

BRIEF DESCRIPTION OF THE DRAWINGS

The above advantages of the present invention will become more apparent upon consideration of a preferred embodiment thereof with reference to the attached drawings in which.

DETAILED DESCRIPTION OF THE INVENTION

Figure 1:
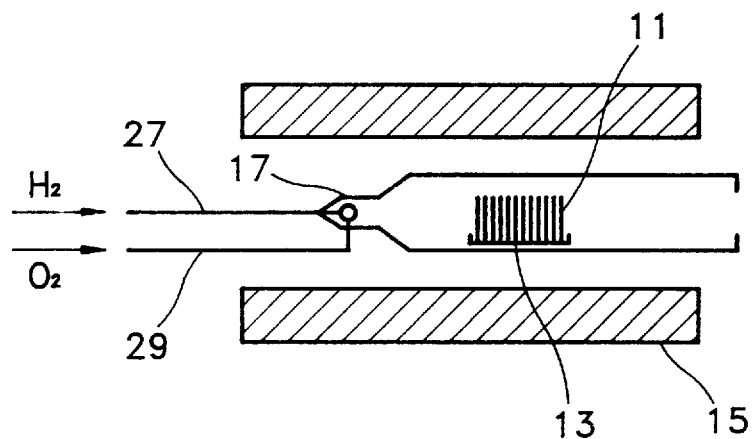
FIG. 1 is a schematic of a typical oxidation furnace.
Figure 2:
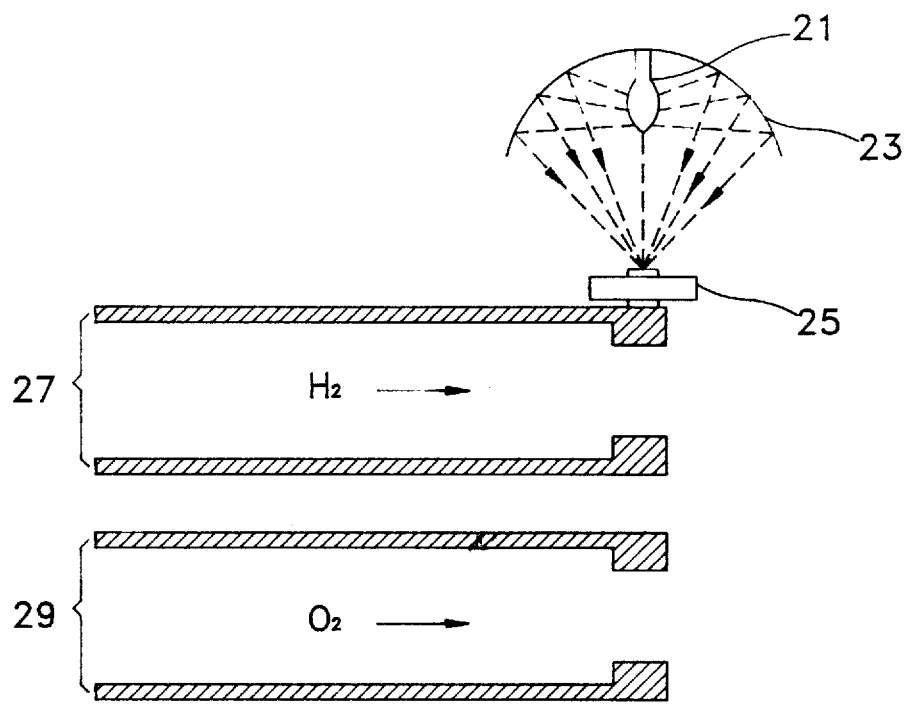
FIG. 2 shows a conventional combustion device used in the furnace of FIG. 1.
Figure 3:
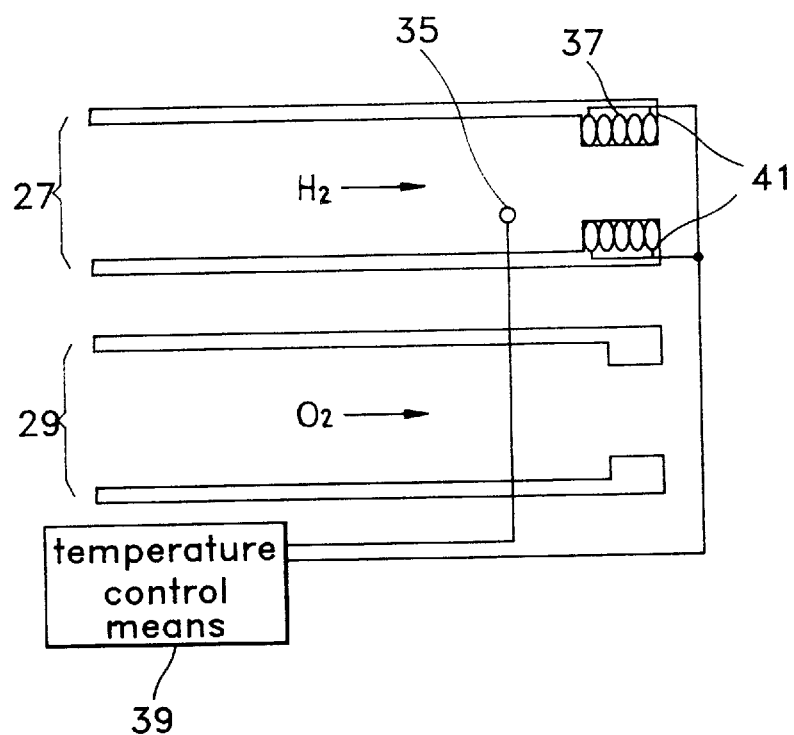
FIG. 3 is a sectional view of a combustion device used in a furnace, according to the present invention.

Referring to FIG. 3, a combustion device according to the present invention comprises an $H_2$ gas nozzle 27, an $O_2$ nozzle 29, a sensor 35 detecting the temperature of the gas in the $H_2$ gas nozzle, a coil 37 installed in a head 41 of the $H_2$ gas nozzle, and a temperature control device 39 connected to the coil 37 and to gas temperature sensor 35.

Use of the foregoing combustion device will now be described. $H_2$ and $O_2$ gases are provided through the nozzles 27 and 29, respectively. An electrical current is applied to the coil 37. Thus, heat is generated at the head 41 of the $H_2$ gas nozzle 27, and the temperature within the $H_2$ gas nozzle increases to reach the temperature suitable for the combustion. Then, the $H_2$ gas burns, reacting with the $O_2$ gas to thus generate $H_2O$. At this time, the temperature of the $H_2$ gas is detected by gas temperature sensor 35. Also, the temperature control device 39 keeps an appropriate temperature by controlling the amount of the current supplied to coil 37 in response to the temperature detected by the sensor 35.

As described above, according to the present invention, insufficient combustion of the $H_2$ and $O_2$ gases due to corrosion or contamination of the reflective mirror is solved by replacing the reflective mirror heating apparatus with a feedback controlled heating coil which receives electrical current as needed to maintain a combustion temperature in either gas feed. By so insuring adequate gas combustion, an oxide film is properly formed on the surface of an object silicon wafer in an oxidation furnace incorporating the combustion device defined by the present invention.

What is claimed is:

1. A combustion device for use in a furnace, comprising:

a first gas nozzle providing a first gas;

a second gas nozzle providing a second gas; and a combustion means for directly raising a temperature of said first gas to a combustion temperature, and reacting said first gas with said second gas so as to combust said first and second gases within said combustion device, said combustion means comprising an electrical heating coil disposed in the first gas nozzle.

2. The combustion device of claim 1, wherein the first gas is $H_2$ and the second gas is $O_2$.

3. The combustion device of claim 1, further comprising:

a gas temperature sensor placed in the first gas nozzle, detecting the temperature of the first gas, and providing a signal indicative of the detected temperature; and, a temperature controller receiving the signal from the gas temperature sensor and regulating electrical current supplied to the electrical heating coil in response to the signal.

4. A method of using a combustion device in an oxidation furnace, comprising the steps of:

providing first and second gases through respective first and second nozzles;

heating the first gas to a combustion temperature by directly flowing said first gas past an electrical heating coil disposed in the first nozzle; and reacting said first gas with said second gas such that the gases combust within said combustion device.

5. The method of claim 4, further comprising the steps of:

detecting the temperature of the first gas; and, adjusting the flow of electrical current to the electrical heating coil in response to the detected temperature.

* * * * *